June 30, 1970   R. W. McGILLION ET AL   3,517,990
FADE-IN, FADE-OUT CONTROL
Original Filed May 29, 1967
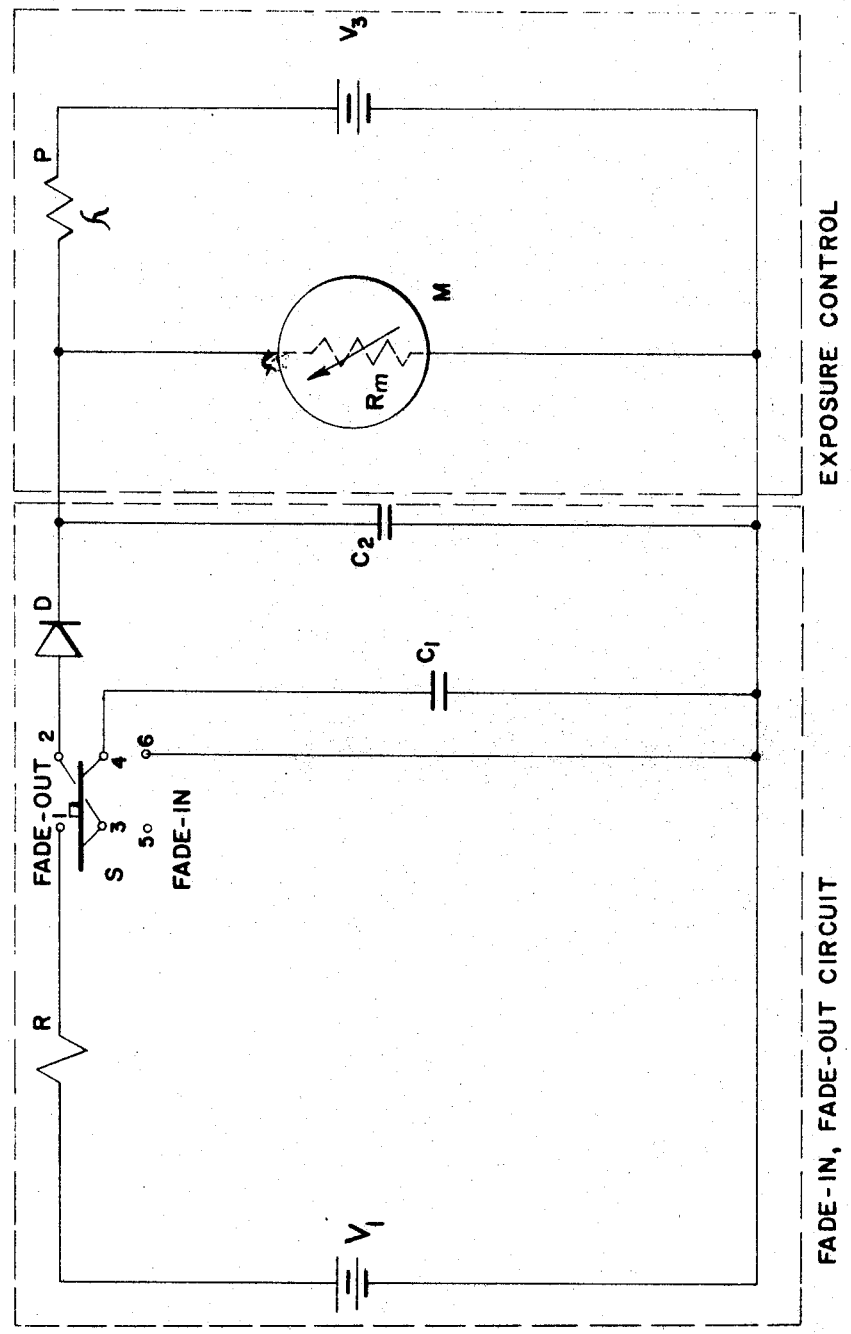
ROBERT W. MC GILLION
WILLIAM S. OWEN, JR.
INVENTORS
BY Daniel E. Sragow
Robert W Hampton
ATTORNEYS 3,517,990
FADE-IN, FADE-OUT CONTROL
Robert W. McGillion and William S. Owen, Jr.,
Rochester, N.Y., assignors to Eastman Kodak
Company, Rochester, N.Y., a corporation of New
Jersey
Continuation of application Ser. No. 641,869, May 29,
1967. This application Oct. 2, 1969, Ser. No. 863,773
Int. Cl. G03b 21/36
U.S. Cl. 352—91                                      4 Claims

ABSTRACT OF THE DISCLOSURE

A fade-in, fade-out control for a motion picture camera in which the rate of charge or discharge of a capacitor determines the rate at which the diaphragm opens and closes. A photoelectric element is coupled in series with a battery and a transducer for operating the aperture control diaphragm in response to light striking the photoelectric element. A first capacitor is connected in parallel with the transducer; a second capacitor is selectively connected in parallel with the first capacitor; and a second battery is selectively connected in parallel with the two capacitors. A switch may be positioned in a first position to couple the second capacitor and second battery in parallel with the transducer to charge both capacitors to a potential higher than the first battery to gradually decrease the exposure aperture, or in a second position the switch will uncouple the second capacitor from the second battery to allow the first capacitor to gradually discharge through the transducer to the value of the first potential to thereby gradually open the exposure aperture.

This is a continuation of application Ser. No. 641,869, filed May 29, 1967, now abandoned.

BACKGROUND OF THE INVENTION

This invention relates to a photographic exposure-control system, and more particularly to means for controlling "fade-in" and "fade-out" between scenes photographed by cine cameras.

Customarily, motion-picture cameras have not been equipped with means to preserve the identity of each separate series of exposures. Thus, when one series of exposures is completed, the aperture is immediately closed upon de-activation of the shutter, release switch. The next series of exposures begins abruptly upon actuation of the shutter, release switch and, ideally, under optimum exposure conditions. When projecting the pictures onto a screen, however, there is no smooth transition between each series of exposures. Thus one may be watching scenes from a particular setting, and abruptly, without warning, the film moves to another setting which may have been taken months later and in an entirely different and unrelated, place. It is therefore desirable to provide means for distinguishing between each series of exposures to provide a smooth transition between settings, thereby making the viewer aware of when each particular series of exposures has ended.

SUMMARY OF THE INVENTION

This invention relates to means for fading out any particular series of exposures and for fading in a subsequent series of exposures when the two series are unrelated. This is accomplished by the superimposing of voltages onto a standard exposure control device to cause the aperture to slowly close upon ending a particular series of exposures and to cause it to slowly open at the beginning of the subsequent series. Thus the persons viewing the film are made aware, through the smooth transition between independent series of exposures, that the series are unrelated.

An object of this invention is to provide means for the viewer to distinguish between the various unrelated series of motion-picture exposures.

A further object of this invention is to provide means for fading out one series of exposures and gradually fading in a subsequent, unrelated series of exposures of motion-picture film to preserve the identity of each individual series.

Another object of this invention is to provide a device associated with the exposure control system of a motion-picture camera to gradually fade out the exposure of a particular series of pictures by a gradual closing of the camera aperture, and to gradually fade in a subsequent, unrelated series of pictures by the gradual opening of the aperture to the proper exposure setting.

DESCRIPTION OF THE DRAWING

These and other objects will become apparent from the following description and the drawing, showing a circuit diagram of a preferred embodiment of invention.

DESCRIPTION OF THE PREFERRED EMBODIMENT

The drawing shows an ordinary EXPOSURE-CONTROL CIRCUIT electrically coupled to a FADE-IN, FADE-OUT CIRCUIT. The EXPOSURE CONTROL CIRCUIT comprises a meter M (shown electrically as variable resistance $R_m$) in parallel with a voltage source V3 and photosensitive resistor P. Although a photovoltaic cell could be used, for the sake of simplicity in describing the operation of the circuitry, a separate source of voltage V3 and photoresistor P are shown.

The EXPOSURE-CONTROL CIRCUIT functions in accordance with well-known techniques. Meter M is usually of the galvanometric type and has attached to it movable vanes which operate to change the lens opening in accordance with varying conditions of scene illumination. In the absence of light, photoelement P is at maximum resistance, and the lens aperture is completely open, assuming, of course, that the EXPOSURE CONTROL CIRCUIT is acting independently of any influence from the FADE-IN, FADE-OUT CIRCUIT. The camera shutter is ordinarily released after the aperture has been adjusted to the proper size in accordance with the scene illumination so that, in a "normal" mode of operation, the camera operator may immediately begin filming his subject with proper exposure on the first frame. For purposes of simplicity in describing the invention, it will be assumed that source V3 and photoelement P are continually in electrical circuit with meter M. It is understood that any appropriate switching may be utilized to disconnect voltage source V3 and photoelement P when desirable. Capacitor C2 is shown as part of the FADE-IN, FADE-OUT CIRCUIT to identify its function with that circuit. It is understood, however, that capacitor C2 performs an equally valid function in the EXPOSURE-CONTROL CIRCUIT, namely, through dampening the meter movement by its exponential charge as the conditions of scene illumination vary. In "normal" operation, that is, without the FADE-IN, FADE-OUT feature being applied to the EXPOSURE-CONTROL CIRCUIT, switch S is in the position shown in the drawing, and capacitor C2 is charged to the voltage across meter M necessary to achieve the proper exposure setting.

When the camera shutter is released, the initial frame is at the proper exposure in the "normal" mode. If the camera operator desires to discontinue making exposures, he merely releases the shutter control lever, thereby causing the scene illumination to be cut off from the film. Therefore, under "normal" operation, the series of exposures abruptly begins at the proper exposure setting and abruptly ends at the proper exposure setting.

The "normal" operation of the exposure-control device is effected by leaving switch S in the position shown in the drawing. Thus capacitor C2 is, in a sense, strictly identified with the EXPOSURE-CONTROL CIRCUIT. For purposes of explanation of the operation of this invention, it will be assumed that, initially, meter M is at the proper exposure setting and that the shutter is open.

If it is desired to fade out a series of exposures, switch S is moved to make contact with contact points 1 and 2. Voltage source V1 is of a larger value than V3, and it must be kept in mind that capacitor C2 is already charged to the value of the voltage drop across the meter M. As switch S is closed to the FADE-OUT position, capacitor C1 initially acts as a short circuit, but diode D is provided to prevent capacitor C2 from discharging through the path of C1 thus preventing a fade-in at the beginning of a fade-out operation. As C1 begins to charge through resistor R, it eventually reaches the voltage value of the charge across capacitor C2, at which time current begins to flow through diode D to increase the charge on capacitor C2.

As the increased charge on capacitor C2 is dependent upon the RC time constant of R and C1 plus C2, and is of an exponential nature, meter M begins to close exponentially due to the increased voltage. Therefore, the time that it takes for meter M to move the aperture to its completely closed position is dependent upon the value of the RC time constant. Thus the gradual closing of the aperture results in a "fading out" of the exposure of the film.

The increased charge on capacitor C2 is sufficient to maintain the aperture in its closed position, thereby closing off scene illumination from the film, regardless of whether the shutter is open or closed. Of course, after the series of exposures has been faded out, the shutter will be closed by the operator.

In order to "fade in" the next series of exposures, switch S must be left momentarily in the FADE-OUT position to be sure that the capacitors are charged sufficiently to force the aperture to the closed position before the shutter is released. Otherwise, if the switch S is in the "normal" position, that is, in the position illustrated, the EXPOSURE-CONTROL CIRCUIT will act in a normal fashion, and there will be no "fade-in" aspect to the next series of exposures. Thus, for the "fade-in" feature, the switch is moved first to the FADE-OUT position and then to the FADE-IN position after release of the shutter. Capacitor C1 is immediately shorted, through switch points 4 and 6, and capacitor C2 discharges exponentially through meter M until it reaches the proper exposure-setting voltage value which is being provided by source V3 through photoresistor P. Thus meter M gradually opens the aperture to its proper position, thereby fading in that series of exposures.

Ordinarily, the capacitors and resistor R are selected so that the charging time constant of capacitors C1 and C2, in combination with resistors R and $R_m$ when the switch S is in the FADE-OUT position, will be the same as that of the capacitor C2 and resistor $R_m$ when the switch is in the FADE-IN position, thereby permitting the fade-out time to be substantially equal to the fade-in time for purposes of uniformity. Of course, with the use of other circuit parameters, it is possible that capacitor C1 and diode D would be eliminated to achieve the same results.

This invention has been described in detail with particular reference to a preferred embodiment thereof, but it will be understood that variations and modifications can be effected within the scope and spirit of the invention as described hereinabove and as defined in the appended claims.

We claim:

1. In a motion picture camera having movable means forming a variable exposure aperture, an exposure control including:
   (a) photoelectric means for establishing a first potential related in magnitude to scene illumination,
   (b) transducer means coupled in series with said photoelectric means and with said exposure aperture means for varying said exposure aperture in response to a change in the magnitude of said first potential, said transducer means being adapted to actuate the movable means to decrease said aperture when energization of said transducer means is increased,
   (c) a first capacitance coupled in parallel with said transducer means,
   (d) means for establishing a second potential greater in magnitude than the maximum magnitude of said first potential,
   (e) a second capacitance, and
   (f) a switch movable to a first position for coupling said second capacitance and said means for establishing a second potential in parallel with said transducer means to charge said first and second capacitances to a potential higher than said first potential to thereby gradually decrease said exposure aperture, and movable to a second position for uncoupling said second capacitance from said means for establishing a second potential to thereby allow said first capacitance to gradually discharge through said transducer means to the value of said first potential to thereby gradually open said exposure aperture.

2. In a motion picture camera having adjustable means defining a variable exposure aperture and transducer means for adjusting said adjustable means to vary the size of the variable exposure aperture, fade-in, fade-out control apparatus comprising:
   (a) first means responsive to scene illumination for energizing said tranducer means;
   (b) a first capacitance connected in parallel with said transducer means for determining the rate of deenergization of said transducer means;
   (c) second means for energizing said transducer means, and
   (d) means for selectively connecting said second energizing means in parallel with said first capacitance for energizing said transducer means and varying said exposure aperture independently of scene illumination.

3. In a motion picture camera according to claim 2, a fade-in, fade-out control further comprising:
   (a) a second capacitance forming a part of said second energizing means;
   (b) means for charging said second capacitance;
   (c) means for discharging said second capacitance; and
   (d) a switch having at least first and second positions, said switch when in its first position coupling said first and second capacitances together in parallel and to said charging means to increase energization of said transducer means, said switch when in its second position coupling said second capacitance to said discharging means.

4. A fade-in fade-out control according to claim 3 further comprising a diode coupled between said first and second capacitances to prevent said first capacitance from short circuiting said second capacitance.

References Cited

UNITED STATES PATENTS

| | | | |
|---|---|---|---|
| 1,275,863 | 8/1918 | Davis | 352—91 |
| 2,515,330 | 7/1950 | Bolsey | 352—217 X |
| 2,557,389 | 6/1951 | Moomaw | 352—217 X |
| 2,937,563 | 5/1960 | Ranft | 352—91 |
| 3,298,773 | 1/1967 | Auracher | 352—141 |
| 3,391,978 | 7/1968 | Reinsch | 352—141 |
| 3,419,325 | 12/1968 | Mayr | 352—141 X |
| 3,427,941 | 2/1969 | Metzger | 352—141 X |

NORTON ANSHER, Primary Examiner

M. H. HAYES, Assistant Examiner

U.S. Cl. X.R.

352—141, 217